United States Patent
Meek et al.

(10) Patent No.: US 10,294,908 B2
(45) Date of Patent: May 21, 2019

(54) FUEL INJECTOR

(71) Applicants: WESTPORT POWER INC., Vancouver (CA); DELPHI INTERNATIONAL OPERATIONS LUXEMBOURG S.À.R.L., Bascharage (LU)

(72) Inventors: George A. Meek, Lydney (GB); Lukhbir Panesar, Feltham (GB); Michael Colin Wickstone, Richmond (CA)

(73) Assignee: WESTPORT POWER INC., Vancouver (CA)

( * ) Notice: Subject to any disclaimer, the term of this patent is extended or adjusted under 35 U.S.C. 154(b) by 108 days.

(21) Appl. No.: 14/892,978

(22) PCT Filed: May 21, 2014

(86) PCT No.: PCT/CA2014/050468
§ 371 (c)(1),
(2) Date: Nov. 20, 2015

(87) PCT Pub. No.: WO2014/186891
PCT Pub. Date: Nov. 27, 2014

(65) Prior Publication Data
US 2016/0115924 A1    Apr. 28, 2016

(30) Foreign Application Priority Data

May 21, 2013 (GB) .................................. 1309118.6

(51) Int. Cl.
*F02M 61/10*    (2006.01)
*F02M 43/04*    (2006.01)
(Continued)

(52) U.S. Cl.
CPC ............. *F02M 61/10* (2013.01); *F02F 1/242* (2013.01); *F02M 43/04* (2013.01); *F02M 45/00* (2013.01);
(Continued)

(58) Field of Classification Search
CPC .... F02M 61/10; F02M 63/0064; F02M 61/08; F02M 61/045; F02M 45/10; F02M 45/00;
(Continued)

(56) References Cited

U.S. PATENT DOCUMENTS 5,722,373 A   3/1998  Paul et al.
5,820,033 A  10/1998  Cooke
(Continued)

FOREIGN PATENT DOCUMENTS

CA    2 743 043 A1   8/2011
CN    101283175 A   10/2008
(Continued)

OTHER PUBLICATIONS

Extended Search Report from European Patent Office dated Oct. 18, 2016, issued in corresponding European Application No. 14800450.0 (6 pages).
(Continued)

*Primary Examiner* — Darren W Gorman
*Assistant Examiner* — Qingzhang Zhou
(74) *Attorney, Agent, or Firm* — Seed IP Law Group LLP (57) ABSTRACT

A fuel injector, preferably a dual fuel injector, for an internal combustion engine is disclosed. The fuel injector comprises first and second valve needles (80, 100) arranged to control the injection of first and second fuels, first and second control chambers (88, 10) associated with the first and second valve needles (80, 100) respectively, a first control valve (26) comprising a first control valve member (48) and arranged to vary the pressure of a control fluid in the first
(Continued)

control chamber (88) so as to cause opening and closing movement of the first valve needle (80), and a second control valve (28) comprising a second control valve member (60) and arranged to vary the control fluid 10 pressure in the second control chamber (110) so as to cause opening and closing movement of the second valve needle (100). The first and second control valve members (48, 60) are arranged for linear movement along a common control valve axis.

18 Claims, 4 Drawing Sheets

(51) Int. Cl.

| | | |
|---|---|---|
| *F02M 45/08* | (2006.01) | |
| *F02M 47/02* | (2006.01) | |
| *F02F 1/24* | (2006.01) | |
| *F02M 45/00* | (2006.01) | |
| *F02M 45/10* | (2006.01) | |
| *F02M 61/04* | (2006.01) | |
| *F02M 61/08* | (2006.01) | |
| *F02M 63/00* | (2006.01) | |
| *F02M 61/18* | (2006.01) | |
| *F02D 41/00* | (2006.01) | |
| *F02D 19/06* | (2006.01) | |

(52) U.S. Cl.
CPC .......... *F02M 45/086* (2013.01); *F02M 45/10* (2013.01); *F02M 47/027* (2013.01); *F02M 61/045* (2013.01); *F02M 61/08* (2013.01); *F02M 61/182* (2013.01); *F02M 63/0064* (2013.01); *F02D 19/0694* (2013.01); *F02D 41/0025* (2013.01); *F02D 41/0027* (2013.01); *F02M 2200/21* (2013.01); *F02M 2200/46* (2013.01); *F02M 2547/003* (2013.01); *Y02T 10/36* (2013.01)

(58) Field of Classification Search
CPC .. F02M 61/182; F02M 45/086; F02M 47/027; F02M 43/04; F02M 2547/003; F02M 2200/21; F02M 2200/46; F02F 1/242; Y02T 10/36; F02D 19/0694
USPC ....... 239/5, 408, 410, 413, 414, 88, 96, 304, 239/445; 123/304, 445, 446, 525
See application file for complete search history.

(56) References Cited

U.S. PATENT DOCUMENTS

| | | | |
|---|---|---|---|
| 6,340,121 B1 | 1/2002 | Lambert | |
| 7,124,959 B2 | 10/2006 | Baker et al. | |
| 2005/0224600 A1 | 10/2005 | Brenk et al. | |
| 2007/0034188 A1* | 2/2007 | Duffy ................ | F02D 41/3035 123/299 |
| 2011/0108631 A1 | 4/2011 | Mumford et al. | |
| 2012/0285417 A1* | 11/2012 | Kim .................... | F02D 19/0684 123/299 |
| 2012/0325180 A1 | 12/2012 | Montgomery | |
| 2014/0123937 A1 | 5/2014 | Wickstone et al. | |

FOREIGN PATENT DOCUMENTS

| | | |
|---|---|---|
| CN | 102105673 A | 6/2011 |
| EP | 0 740 068 A2 | 10/1996 |
| EP | 0 740 068 A3 | 8/1997 |
| EP | 1 234 966 A2 | 8/2002 |
| EP | 0 987 431 B1 | 12/2003 |
| EP | 0 957 262 B1 | 9/2004 |
| EP | 1 541 860 B1 | 7/2007 |
| EP | 1 835 171 B1 | 3/2008 |
| EP | 1 604 104 B1 | 8/2008 |
| EP | 1 670 005 B1 | 12/2008 |
| EP | 2 050 951 A1 | 4/2009 |
| EP | 2 060 774 A1 | 5/2009 |
| EP | 1 988 276 B1 | 3/2011 |
| EP | 2 290 219 B1 | 1/2013 |
| JP | 2002-525475 A | 8/2002 |
| JP | 2007-239735 A | 9/2007 |
| JP | 2009-57884 A | 3/2009 |
| WO | 00/15956 A1 | 3/2000 |
| WO | 2012/171119 A1 | 12/2012 |
| WO | 2013/033136 A1 | 3/2013 |

OTHER PUBLICATIONS

Chinese Office Action, dated Jul. 16, 2018, for Chinese Application No. 201480029000.2, 13 pages. (With English Machine Translation).
Japanese Notice of Allowance, dated Apr. 10, 2018, for Japanese Application No. 2016-514226, 5 pages. (With English Machine Translation).
Chinese First Office Action, dated Nov. 1, 2017, for Chinese Application No. 20140029002, 5 pages. (with English Machine Translation).
Chinese Search Report, dated Oct. 15, 2017, for Chinese Application No. 20140029002, 4 pages. (with English Translation).

\* cited by examiner

FUEL INJECTOR

FIELD OF THE INVENTION

The present invention relates to a fuel injector suitable for controlling the delivery of two different fuels into an internal combustion engine. In particular, but not exclusively, the invention relates to a fuel injector suitable for injecting a gaseous fuel and a liquid fuel.

BACKGROUND OF THE INVENTION

Internal combustion engines for heavy-duty and industrial applications are typically fuelled by diesel. However, the use of natural gas as an alternative to diesel is of increasing interest. Natural gas is relatively abundant and relatively cheap, and can, in principle, provide similar levels of power to diesel whilst producing lower particulate and nitrogen oxide (NOx) emissions.

Natural gas can be used in place of diesel to fuel a compression-ignition engine, in which combustion of the fuel occurs as a result of compression of the air-fuel mixture in the cylinder. However, because natural gas has a higher auto-ignition temperature than diesel, it can be necessary to initiate combustion with a pilot injection of diesel fuel before introducing the natural gas to the combustion chamber.

In one type of natural gas-powered engine, known as a high-pressure direct injection (HPDI) engine, both natural gas and diesel are injected directly into the combustion chamber. Due to the space constraints in an engine cylinder head, it is desirable to inject both fuels using one fuel injector per cylinder. This requires a fuel injector that is specially adapted to keep the two fuels separate within the injector, and to deliver independently the respective fuel at the appropriate time.

One such 'dual fuel' injector is described in International Patent Application Publication No. WO 00/15956. In this example, a fuel injector with a concentric twin nozzle arrangement is provided. Inner and outer valve needles are engageable at their lower ends with respective valve seats to control the flow of fuel through respective inner and outer sets of outlets. The outer valve needle controls the injection of natural gas through the outer set of outlets, and the inner valve needle controls the injection of diesel through the inner set of outlets. The outer valve needle is tubular to accommodate the inner valve needle, and the inner set of outlets is formed at a tip of the outer valve needle.

The inner and outer valve needles are controlled independently by two electromagnetic control valves, which are configured to control the pressure of a control fluid (normally diesel fuel) within respective control chambers for the inner and outer valve needles. The control chambers receive the upper ends of the respective needles, so that changing the pressure of the control fluid in each control chamber changes the downward (closing) force on the corresponding needle. Gas or diesel fuel pressure acts on downwardly-facing thrust surfaces of the respective needles to generate an upward (opening) force on the needle. When the pressure of the control fluid in a control chamber is relatively high, the downward force is greater than the upward force and the respective needle remains seated, and when the pressure of the control fluid is relatively low, the upward force overcomes the downward force and the respective needle opens to permit fuel injection through the respective set of outlets.

Each control chamber is connected to a source of control fluid at relatively high pressure. Each control valve is operable to connect the respective control chamber to a low-pressure drain for the control fluid. In this way, opening of each control valve causes a reduction in the pressure of the control fluid in the corresponding control chamber, resulting in opening of the corresponding valve needle.

The injector is mounted in a bore in the cylinder head of the engine. A main body of the injector extends through the bore, so that the tip of the injector protrudes into the respective combustion chamber. The maximum diameter of the cylinder head bore, and hence the diameter of the main body of the injector, is constrained by the limited space available in the cylinder head. The electromagnetic actuators used to actuate the control valves are generally too large to be accommodated in the main body of the injector. Instead, the actuators and control valves are typically mounted in a side-by-side configuration at the top of the fuel injector, so that they protrude above the cylinder head.

Injectors of this type therefore have a relatively bulky top end, which takes up space in the region above the cylinder head. It would be desirable to reduce the amount of space taken up by the injectors above the cylinder head, for to create extra space for fuel rails and other engine components. It is against this background that the present invention has been devised.

SUMMARY OF THE INVENTION

From a first aspect, the present invention resides in a fuel injector for an internal combustion engine, comprising first and second valve needles arranged to control the injection of first and second fuels, first and second control chambers associated with the first and second valve needles respectively, a first control valve comprising a first control valve member and arranged to vary the pressure of a control fluid in the first control chamber so as to cause opening and closing movement of the first valve needle, and a second control valve comprising a second control valve member and arranged to vary the control fluid pressure in the second control chamber so as to cause opening and closing movement of the second valve needle. The first and second control valve members are arranged for linear movement along a common control valve axis.

By arranging the first and second control valves so that the first and second control valve members are aligned along a common control valve axis, the control valves can be mounted in more a space-efficient configuration than in previously-known injectors that are capable of injecting two different fuels.

Preferably, the first fuel is a gaseous fuel, and the second fuel is a liquid fuel. For example, the first fuel may be natural gas, and the second fuel may be diesel. The control fluid may be the first fuel or the second fuel. Preferably, the control fluid is diesel.

At least one of the first and second control valves may be housed within a generally cylindrical body portion of the injector. In one embodiment, both the first and the second control valves are housed within the body portion of the injector. The body portion of the injector is preferably arranged to fit within a cylinder head bore of the engine, in use. In this way, one or both of the control valves can be housed within the part of the injector that is contained within the cylinder head bore, reducing the space required by the injector above the cylinder head.

Preferably, the control valve members are substantially hydraulically balanced. In this way, the force required to move the control valve members is relatively small, so that the control valves can be operated by relatively small actuators, thereby reducing the size of the control valves.

In one embodiment, the first valve needle comprises a bore for receiving the second valve needle, and the first and second valve needles are moveable along a common valve needle axis. The control valve axis may be offset from and parallel to the valve needle axis.

The control valves may be solenoid actuated. Conveniently, the fuel injector may comprise a control valve assembly including a common core member, a first solenoid coil for actuating the first control valve, and a second solenoid coil for actuating the second control valve. By providing a common core member that is shared between the two control valves, the space occupied by the control valves can be further reduced.

In one embodiment, the first control valve member and the second control valve member are each moveable between a filling position, in which the respective control valve member is seated on a valve seat to prevent communication between the respective control chamber and a low-pressure drain for the control fluid, and a drain position in which the respective control valve member is lifted from the valve seat to permit communication between the respective control chamber and the low-pressure drain.

The first valve member may be moveable from its filling position to its drain position in a first direction, and the second valve member may be movable from its filling position to its drain position in a second direction, opposite to the first direction.

In one embodiment, the first control valve member has a larger diameter than the second control valve member. Correspondingly, the volume of the first control chamber is larger than the volume of the second control chamber.

The first control valve may be arranged to govern fluid flow from a source of control fluid to the first control chamber, such that, when the first control valve member is in its filling position, fluid flow from the source of control fluid to the first control chamber is permitted and, when the first control valve member is in its drain position, fluid flow from the source of control fluid to the first control chamber is prevented.

Alternatively or in addition, the second control valve may be arranged to govern fluid flow from a source of control fluid to the second control chamber, such that, when the second control valve member is in its filling position, fluid flow from the source of control fluid to the second control chamber is permitted and, when the second control valve member is in its drain position, fluid flow from the source of control fluid to the second control chamber is prevented.

BRIEF DESCRIPTION OF THE DRAWINGS

The present invention will now be described, by way of example only, with reference to the accompanying drawings, in which like reference numerals are used for like features, and in which.

DETAILED DESCRIPTION OF EMBODIMENTS OF THE INVENTION

Figure 1:
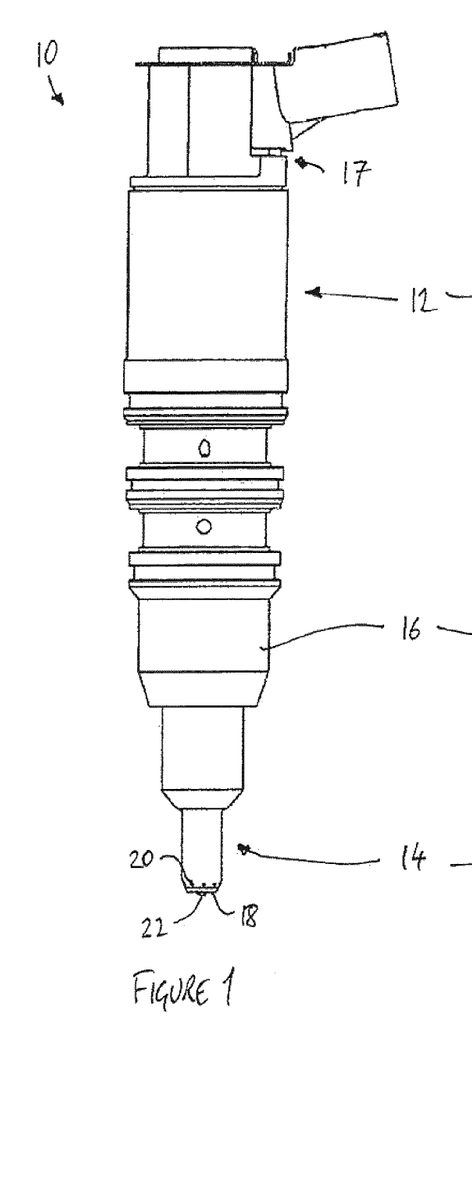
FIG. 1 is a side view of a fuel injector according to the present invention.
Figure 2:
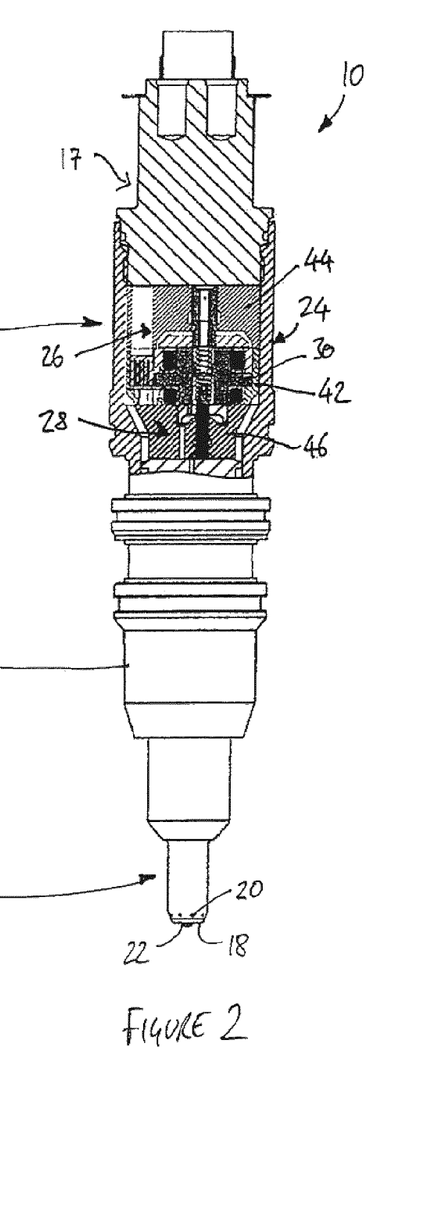
FIG. 2 is a part-sectional side view of the fuel injector of FIG. 1.

Referring to FIGS. 1 and 2, a fuel injector 10 according to the present invention is generally elongate in form. The fuel injector 10 comprises an injector body 12, also known as a nozzle holder, and a nozzle body 14. The injector body 12 and the nozzle body 14 are held together in an end-to-end configuration by a cap nut 16, which is in threaded engagement with the lower end of an injector cap part 17.

A tip region 18 of the nozzle body 14 includes an outer set of outlets 20 and an inner outlet 22. As will be explained in more detail below, injection of a first fuel through the outer set of outlets 20 is controlled by a first or outer valve needle (not shown in FIGS. 1 and 2), and injection of a second fuel through the inner outlet 22 is controlled by a second or inner valve needle (not shown in FIGS. 1 and 2).

As shown most clearly in FIG. 2, the injector body 12 is generally cylindrical. The injector body 12 comprises a control valve assembly 24, which is shown in more detail and in isolation in FIGS. 3 and 4.

Figure 3:
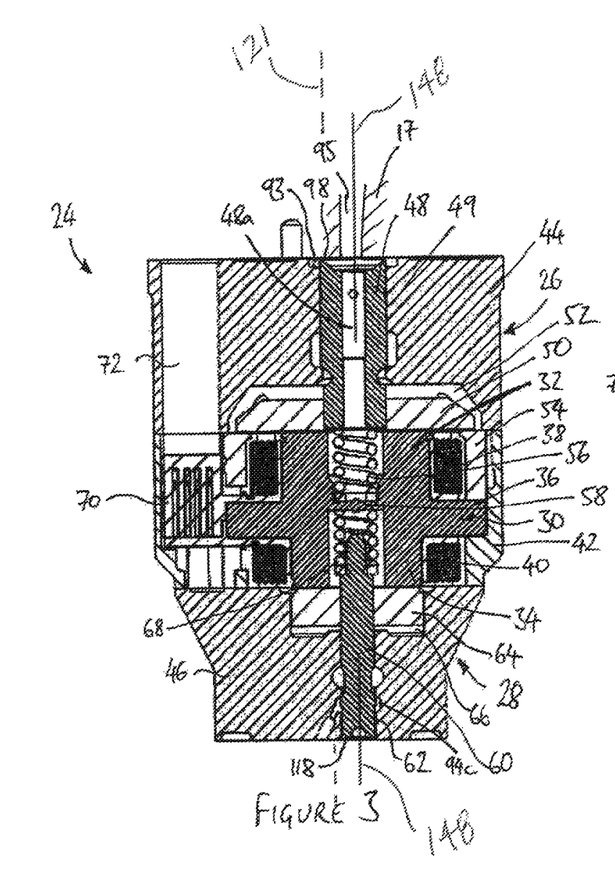
FIG. 3 is a sectional view of part of the fuel injector of FIG. 1.
Figure 4:
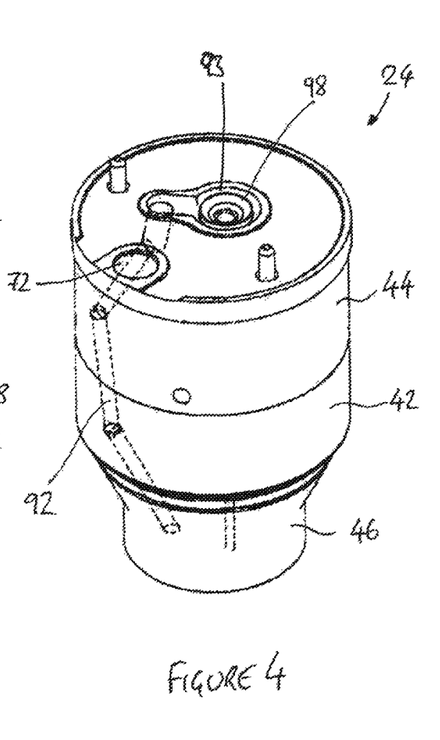
FIG. 4 is a perspective view of part of the fuel injector of FIG. 1.

The control valve assembly 24 comprises a first control valve, indicated generally at 26, and a second control valve, indicated generally at 28. The first and second control valves 26, 28 are both electromagnetically actuated, and share a common solenoid core member 30. The core member 30 is shaped to form a first generally tubular pole piece 32 and a second generally tubular pole piece 34. The first and second pole pieces 32, 34 extend in opposite directions from an annular outwardly-directed flange 36. A first solenoid coil 38 is disposed around the first pole piece 32, and a second solenoid coil 40 is disposed around the second pole piece 34.

The core member 30 and the first and second coils 38, 40 are housed within a generally tubular intermediate injector body part 42. The intermediate injector body part 42 is closed at its upper end by an upper, generally cylindrical, injector body part 44, and at its lower end by a lower injector body part 46. The lower injector body part 46 has a frusto-conical upper region and a cylindrical lower region.

The first control valve 26 includes a control valve member 48 (known hereafter as the first control valve member) that is slidably received in a bore 49 in the upper injector body part 44. The first control valve member 48 is attached to a disc-shaped armature 50 that is housed in a recess 52 in the lower face of the upper injector body part 44. In this way, the armature 50 is disposed adjacent to the upper end of the first pole piece 32 of the core member 30. A pole ring 54 is disposed around the periphery of the first coil 38, such that the pole ring 54 serves as an outer pole of the first control valve 26.

The first control valve member 48 is biased into a first position, known as a filling position, by a first biasing spring 56. The first biasing spring 56 is engaged with the control valve member 48 at one end, and is supported at its other end by a web 58 of the core member 30 that separates the bores of the first and second pole pieces 32, 34. When the first coil 38 is energised, the armature 50 moves towards the first pole piece 32, drawing the first control valve member 48 into a second position, known as a drain position. In the orientation of FIG. 3, the first control valve member 48 moves downwards, towards the core member 30, as it switches from the filling position to the drain position.

Similarly, the second control valve 28 also includes a control valve member 60 (known hereafter as the second control valve member) that is slidably received in a bore 62 in the lower injector body part 46. The second control valve member 60 is attached to a disc-shaped armature 64 that is housed in a recess 66 in the upper face of the lower injector body part 46. The armature 64 is therefore disposed adjacent to the lower end of the second pole piece 34 of the core member 30. In this embodiment, the armature 64 of the second control valve 28 has a diameter similar to the diameter of the second pole piece 34, and no outer pole is provided in the second control valve 28.

The second control valve member 60 is biased into a first position, known as a filling position, by a second biasing spring 68. The second biasing spring 68 is engaged with the second control valve member 60 at one end, and is supported at its other end by the web 58 of the core member 30. When the second coil 40 is energised, the armature 64 of the second control valve 28 moves towards the second pole piece 34, drawing the second control valve member 60 into a second position, known as a drain position.

In the orientation of FIG. 3, the second control valve member 60 moves upwards, towards the core member 30, as it switches from the filling position to the drain position. The second control valve member 60 therefore moves in the opposite direction to the first control valve member 48 when each control valve member 48, 60 moves from its respective filling position to its respective drain position.

The first and second control valve members 48, 60 are arranged along a common axis, known as a control valve axis. As shown most clearly in FIG. 2, the control valve axis 148 is radially offset from the axis 121 of the nozzle body 14, and hence the axis 180 along which the inner and outer valve needles (not shown in FIG. 2) are movable.

The first and second coils 38, 40 are controlled independently by an electronic control unit (not shown). Electrical connections to each of the coils 38, 40 are made through an internal connector 70 housed alongside the core member 30 in the intermediate injector body part 42. A bore 72 extends through the upper injector body part 44 and the intermediate injector body part 42 to receive an electrical connector (not shown). The bore 72 extends through relatively thick parts of the walls of the intermediate injector body part 42 and the upper injector body part 44 that are created as a result of the offset position of the control valve axis 148.

Figure 5:
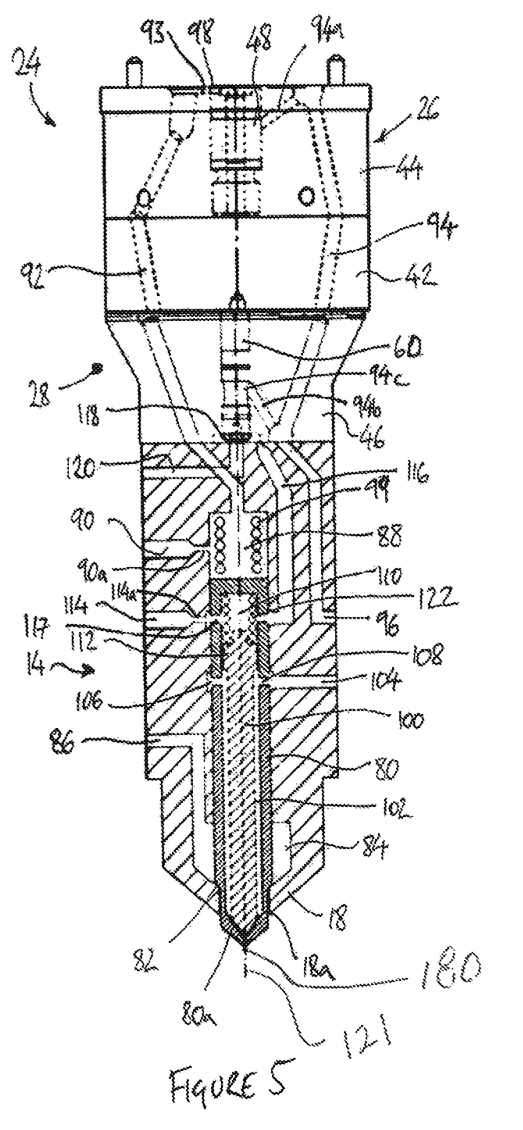
FIG. 5 is a schematic view of part of another fuel injector according to the present invention.

FIG. 5 is a schematic illustration of the fluid connections between the control valve assembly 24, the components within the nozzle body 14, and the external connections in an injector according to another embodiment of the invention. For clarity, many features of the control valve assembly 24 are omitted from FIG. 5; only the first and second control valve members 48, 60 are shown. The injector of FIG. 5 is generally similar to the injector described with reference to FIGS. 1 to 4, and reference should be made to the above description for an explanation of features not further described below.

In this embodiment, the tip region 18 of the nozzle body 14 comprises a circular aperture 18a through which the tubular outer valve needle 80 protrudes. The outer valve needle 80 is engageable with a seating region 82 to control the flow of a first fuel through an outer set of outlets (not shown) downstream of the seating region 82. In a lower part of the nozzle body 14, an annular accumulator volume 84 for the first fuel is disposed around the outer valve needle 80. When the outer valve needle is engaged with its seating region 82, fuel flow from the accumulator volume 84 through the outer set of outlets is prevented, and when the outer valve needle 80 is lifted from its seating region 82, fuel can pass from the accumulator volume 84 through the outer set of outlets for injection into the combustion chamber of the engine.

The first fuel is supplied to the accumulator volume 84 by way of a supply passage 86 in the wall of the nozzle body 14. When the injector is mounted in a cylinder head (not shown) in use, the supply passage 86 registers with a gallery in the cylinder head from which the first fuel is supplied to the injector.

Movement of the outer valve needle 80 is controlled hydraulically, by varying the pressure of a control fluid in a first control chamber 88. The first control chamber is disposed in the nozzle body 14 at the upper end of the outer valve needle 80. An upper surface of the outer valve needle 80 is exposed to fluid pressure in the first control chamber 88.

Control fluid is admitted to the first control chamber 88 through a first control fluid inlet passage 90. The first control fluid inlet passage 90 includes a restricted orifice or throttle 90a, which serves to limit the flow rate of the control fluid as it flows into the first control chamber 88.

Referring additionally to FIG. 4, the first control chamber 88 is connected to the first control valve 26 by way of a first service pathway 92, which comprises a series of interconnecting drillings that extend through the nozzle body 14, the lower injector body part 46, the intermediate injector body part 42 and the upper injector body part 44. The service pathway 92 is connected with an annular valve chamber 93 disposed around the upper end 98 of the first control valve 48.

Referring back to FIG. 5, a control fluid supply pathway 94 comprises a further series of interconnecting drillings that extend through the nozzle body 14, the lower injector body part 46, the intermediate injector body part 42 and the upper injector body part 44. The control fluid supply pathway 94 is connected to a second control fluid inlet passage 96 in the nozzle body 14. The first and second control fluid inlet passages 90, 96 receive control fluid at relatively high pressure from a gallery in the cylinder head bore (not shown) when the injector is installed.

A branch 94a of the control fluid supply pathway 94 supplies control fluid to a gallery associated with the first control valve member 48. The first control valve member 48 includes a shoulder (not shown) that is engageable with a seating region (not shown) of the first control valve bore 49 to form a first seat of the first control valve member 48. The end 98 of the first control valve member 48 is engageable with a seating region defined on the lower surface of the injector cap part 17 (see additionally FIGS. 1 and 4) to form a second seat of the first control valve member 48. A drain passage (indicated at 95 in FIG. 3), formed in the injector cap part 17, is provided downstream of the second seat. The drain passage is connected to a low-pressure drain for the control fluid.

When the first control valve member 48 is in its filling position, the shoulder is disengaged from its seating region, allowing control fluid to flow past the first seat from the gallery into the annular chamber 93 and to the first control chamber 88, through the first service pathway 92. At the same time, the end 98 of the first control valve member 48 is engaged with its seating region, so that control fluid cannot flow from the annular chamber 93 into the drain passage 95 past the second seat. In this way, the control chamber 88 is filled with control fluid at relatively high pressure. The resulting force that acts on the outer valve needle 80 is sufficient to keep the outer valve needle 80 seated, thereby to prevent injection of the first fuel from the injector.

When the first coil 38 is energised to move the first control valve member 48 to its drain position, the shoulder engages with its seating region to stop the flow of control fluid into the first service pathway 92 at the first seat. At the same time, the end 98 of the first control valve member 48 disengages from its seating region to allow control fluid in the first service pathway 92 to flow to the low-pressure drain. The rate of outflow of control fluid from the first control chamber 88 to drain exceeds the rate of inflow of control fluid into the first control chamber 88 from the first control fluid inlet passage 90, by virtue of the throttle 90a. In this way, the pressure of control fluid in the first control chamber 88 decreases, allowing the outer valve needle 80 to lift from its seating so as to cause the first fuel in the accumulator volume 84 to be injected through the outer set of outlets.

To stop injection of the first fuel, the first coil 38 is de-energised so that the first control valve member 48 moves back into its filling position. The pressure of the control fluid in the first control chamber 88 rises once again, forcing the outer valve needle 80 into its closed position. A return spring 99 is housed in the first control chamber 88 to provide an additional closing force to the outer valve needle 80 that keeps the outer valve needle 80 seated when the injector is not operating.

The inner valve needle 100 is housed within the bore of the tubular outer valve needle 80, so that the inner and outer valve needles 100, 80 are arranged along a common valve needle axis. The inner valve needle 100 is engageable with a seating region 80a at the tip of the outer valve needle 80 to control the flow of a second fuel through an inner orifice or set of orifices (not shown) in the tip of the outer valve needle 80.

An annular accumulator volume 102 for the second fuel is disposed between the inner valve needle 100 and the outer valve needle 80. When the inner valve needle is engaged with its seating region 80a, fuel flow from the accumulator volume 102 through the orifices is prevented, and when the inner valve needle 100 is lifted from its seating region 80a, fuel can pass from the accumulator volume 102 through the orifices for injection into the combustion chamber of the engine.

The second fuel is supplied to the accumulator volume 102 by way of a supply passage 104 in the wall of the nozzle body 14, which connects with an annular gallery 106 that extends around the outside of the outer valve needle 80. A plurality of radial drillings 108 permit the second fuel to flow from the annular gallery 106 through the outer valve needle 80 and into the accumulator volume 102. When the injector is mounted in the cylinder head (not shown) in use, the supply passage 104 for the second fuel registers with a gallery in the cylinder head to which the second fuel is supplied.

The annular gallery 106 acts as a fluid seal to guard against leakage of the first fuel in the accumulator volume 84 into the first and second control chambers 88, 110. Accordingly, the pressure of the second fuel in the gallery 106 can be maintained at a higher level than the pressure of the first fuel in the accumulator volume 84.

Movement of the inner valve needle 100 is controlled hydraulically, by varying the pressure of a control fluid in a second control chamber 110. The second control chamber 110 is defined at the upper end of the bore of the outer valve needle 80. An upper surface of the inner valve needle 100 is exposed to fluid pressure in the second control chamber 110, and an enlarged-diameter piston region 112 of the inner valve needle 100 separates the second control chamber 110 from the accumulator volume 102 for the second fuel.

Control fluid is admitted to the second control chamber 110 through a third control fluid inlet passage 114. The third control fluid inlet passage 114 includes a restricted orifice or throttle 114a, which serves to limit the flow rate of the control fluid as it flows into the second control chamber 110. The third control fluid inlet passage 114 receives control fluid at relatively high pressure from the gallery in the cylinder head bore (not shown) when the injector is installed.

The second control chamber 110 is connected to the second control valve 28 by way of a second service pathway 116, which is formed by drillings that extend through the nozzle body 14 and into the lower injector body part 46. A plurality of radial drillings 117 in the outer valve needle 80 are provided to permit fluid communication between the second control chamber 110 and the third control fluid inlet passage 114 and the second service pathway 116. A branch 94b of the control fluid supply pathway 94 supplies control fluid to a gallery 94c associated with the second control valve member 60.

The second control valve member 60 includes a shoulder (not shown) that is engageable with a seating region (not shown) of the second control valve bore 62 to form a first seat of the second control valve member 60. The end 118 of the second control valve member 60 is engageable with a seating region defined on the upper surface of the nozzle body 14 to form a second seat of the second control valve member 60. A drain passage 120, formed in the nozzle body 14, is provided downstream of the second seat. The drain passage 120 is connected to a low-pressure drain for the control fluid.

The operation of the second valve needle 100 is similar to the operation of the first valve needle 80. When the second control valve member 60 is in its filling position, the shoulder is disengaged from its seating region, allowing control fluid to flow past the first seat from the gallery 94c to the second control chamber 110, through the second service pathway 116. At the same time, the end 118 of the second control valve member 60 is engaged with its seating region, so that control fluid cannot flow into the drain passage 120 past the second seat. In this way, the second control chamber 110 is filled with control fluid at relatively high pressure. The resulting force that acts on the inner valve needle 100 is sufficient to keep the inner valve needle 100 seated, thereby to prevent injection of the second fuel from the injector.

When the second coil 40 is energised to move the second control valve member 60 to its drain position, the shoulder engages with its seating region to stop the flow of control fluid from the gallery 84c into the second service pathway 116 at the first seat. At the same time, the end 118 of the second control valve member 60 disengages from its seating region to allow control fluid in the second service pathway 116 to flow to the low-pressure drain by way of the drain passage 120. The rate of outflow of control fluid from the second control chamber 110 to drain exceeds the rate of inflow of control fluid into the first control chamber 110 from the third control fluid inlet passage 114, by virtue of the throttle 114a. In this way, the pressure of control fluid in the second control chamber 110 decreases, allowing the inner valve needle 100 to lift from its seating 80a so as to cause the second fuel in the accumulator volume 102 to be injected through the orifices.

To stop injection of the first fuel, the second coil 40 is de-energised so that the second control valve member 60 moves back into its filling position. The pressure of the control fluid in the second control chamber 110 rises once again, forcing the inner valve needle 100 into its closed position. A return spring 122 is housed in the second control chamber 110 to provide an additional closing force to the inner valve needle 100 that keeps the inner valve needle 100 seated when the injector is not operating.

In the illustrated embodiments, the first control valve member 48 has a larger diameter than the second control valve member 60. As a result, a higher rate of flow of control fluid is possible through the first control valve 26 in each position than through the second control valve 28. This reflects the relative volumes of the first and second control chambers 88, 110.

It will be appreciated that, in the embodiment shown in FIG. 5, the first and second control valve members 48, 60 are arranged along a common control valve axis 148 that is offset from the common valve needle axis 180 along an offset direction that lies normal to the plane of the figure.

By arranging the first and second control valves such that the first and second control valve members lie along a common control valve axis, and by providing a common core member for both valves, the valves can be housed within the injector body in a space-efficient manner. The use of a common core member also facilitates the use of an internal integrated electrical connector.

Advantageously, the first and second control valves are of the "balanced valve" type. In other words, the first and second control valve members 48, 60 are configured such that the forces that act on the valve members due to the control fluid are substantially hydraulically balanced.

To this end, the first control valve member 48 comprises a through-bore 48a, as shown most clearly in FIG. 3. The through bore 48a communicates with the low-pressure drain passage 95, so that low-pressure control fluid is admitted to the bores of the first and second pole pieces 32, 34. In this way, both ends of the first control valve member 48 are exposed to control fluid at low pressure. The end 98 of the first control valve member 48 is shaped to expose a frusto-conical surface with a projected area in a plane normal to the control valve axis that is equal to the area presented in the same plane by the opposite (lower) end of the first control valve member 48. Equal pressures therefore act on equal areas of the first control valve member 48, and no net hydraulic force is generated when the first control valve member 48 is in its filling position.

Similarly, both ends of the second control valve member 60 are exposed to low-pressure drain fluid. An aperture (not shown) in the web 58 admits low-pressure control fluid to the bore of the second pole piece 34 to act on the upper end of the second control valve member 60. The lower end of the second control valve member 60 is exposed to control fluid at the same low pressure in the drain passage 120 (see FIG. 5), and again the projected areas of each end of the second control valve member 60 are equal so that no net hydraulic force acts on the second control valve member 60 when it is in its filling position.

One key advantage of the use of hydraulically balanced valve members is that the force required to operate the control valves is relatively low. In turn, this means that the biasing springs 56, 68 can be relatively low-force and compact, that the coils 38, 40 can be relatively small, and that the diameters of the armatures 50, 64 can be relatively small. In this way, the valves can be packaged within the diametric envelope of the injector body and therefore housed within the cylinder head bore in use. This significantly reduces the amount of space occupied by the injector in the congested region above the cylinder head, giving more room to house the valve train and other engine components. In addition, in this configuration, the control valves can be mounted relatively close to their associated control chambers, which minimises the hydraulic volume of the control circuit and therefore helps to achieve good needle response and control.

Another advantage of hydraulically balanced valves is that they are not sensitive to the pressure of the control fluid. This means that they remain operable over a wide range of flow rates and operating pressures, and that the same design of control valve assembly can be used in multiple applications.

In the embodiment shown in FIG. 5, both the first control valve 26 and the second control valve 28 are "three-way" valves. Thus each control valve 26, 28 serves to connect the respective control chamber 88, 110 to a low-pressure drain when in the drain position, and to connect the respective control chamber 88, 110 to a high-pressure source of control fluid when in the filling position. This flow of control fluid into the control chambers 88, 110 augments the flow of control fluid into the control chambers through the first and third control fluid inlet passages 90, 114, leading to rapid needle closure.

In variants of the invention, one or both of the first and second control valves 26, 28 may be configured as "two-way" valves. In a two-way valve, the valve serves only to connect the respective control chamber 88, 110 to the low-pressure drain and does not provide a connection to a source of high-pressure control fluid. Instead, re-filling of the respective control chamber 88, 110 occurs only through the first or the third control fluid inlet passages 90, 114.

Figure 6:
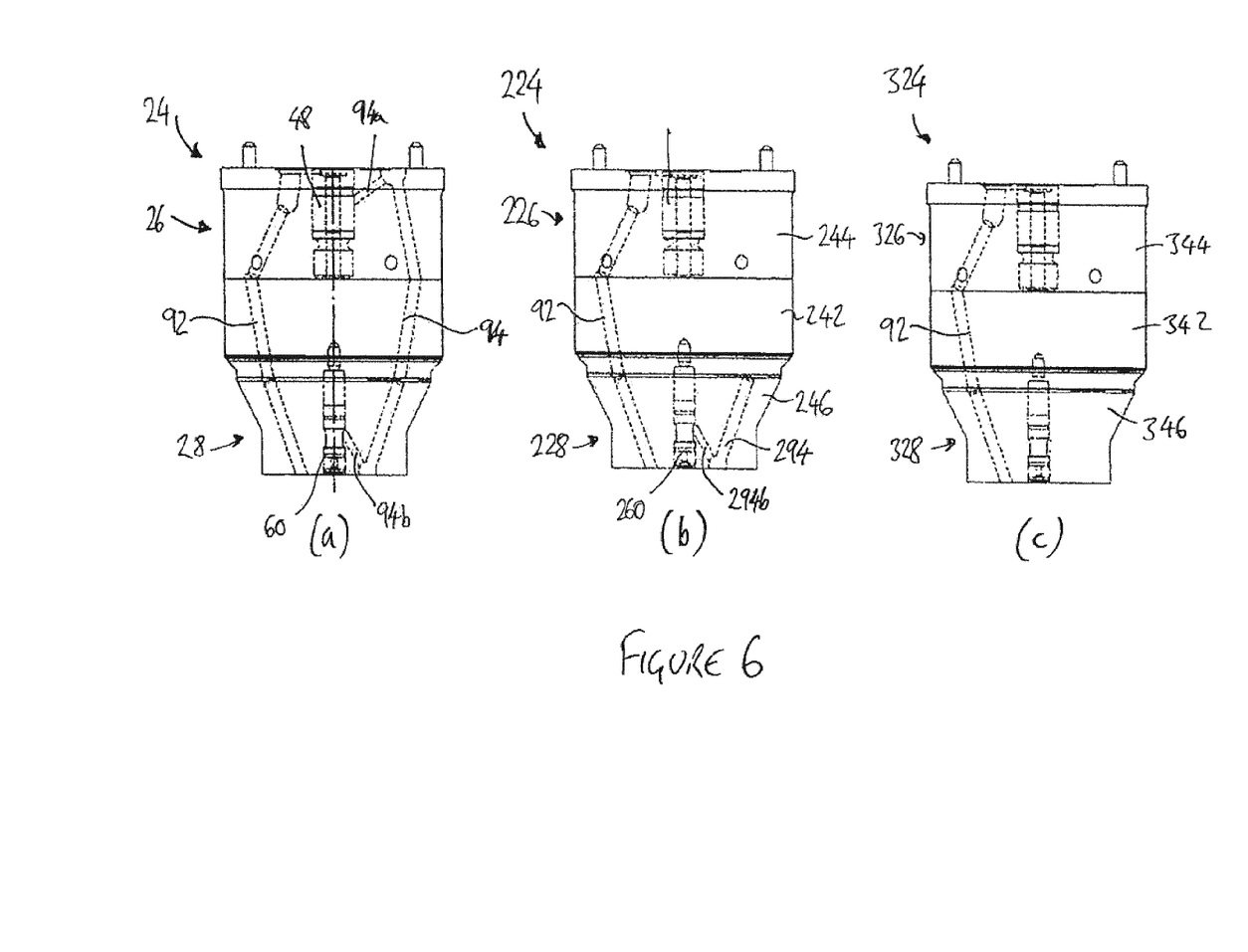
FIGS. 6(a), 6(b) and 6(c) are schematic views of parts of fuel injectors according to three variants of the present invention.

FIG. 6 illustrates schematically the control valve assemblies used in three possible variations of the invention. FIG. 6(*a*) shows the control valve assembly of the embodiment of FIG. 5, in which both the first control valve 26 and the second control valve 28 are of the three-way type. As explained above, in this configuration it is necessary to provide a control fluid supply passage 94 that extends through the whole of the control valve assembly 24.

FIG. 6(*b*) shows a control valve assembly 224 in which the first control valve 226 is of the two-way type, and the second control valve 228 is of the three-way type. In this variant, the control fluid supply passage 294 extends only within the lower body housing 246, where it supplies control fluid to the second control valve member 260 by way of a branch 294b. The control fluid supply passage 294 does not extend into the intermediate body housing 242 or the upper body housing 244, thereby reducing the steps involved in manufacturing the injector, and creating more space for other components in the injector body. The variant of FIG. 6(*b*) can be useful, therefore, when it is desirable to maintain optimum control of the injection duration for the second fuel but when it is acceptable to compromise control of the injection duration for the first fuel to reduce manufacturing costs or to make use of the space saving.

FIG. 6(*c*) shows a control valve assembly 324 in which both the first control valve 326 and the second control valve 328 are of the two-way type. In this configuration, there is no need for a control fluid supply passage. Accordingly, compared to the variant of FIG. 6(*a*), the variant of 6(*c*) is considerably simpler and cheaper to manufacture and offers more space in the lower, intermediate and upper injector body components 346, 342, 344.

The control valves used in the above-described embodiments of the invention can be of any suitable type. Examples of control valve assemblies with a common core member suitable for adaptation for use in the present invention can be found in, for example, the Applicant's European Patents EP 0987431 and EP 1670005. Examples of balanced three-way control valves suitable for use in the present invention can be found in, for example, the Applicant's European Patents EP 1541860, EP 1604104, EP 1988276 and EP 2290219. Examples of balanced two-way control valves suitable for use in the present invention can be found in, for example, the Applicant's European Patents EP 0740068, EP 0957262 and EP 1835171.

In the illustrated examples, the first control valve has a relatively large-diameter armature and an outer pole, and the second control valve has a relatively small-diameter armature and no outer pole. It will be appreciated that the first control valve could instead have a relatively small-diameter armature and no outer pole, and/or the second control valve could have a relatively large-diameter armature with an outer pole.

It is conceivable that the first and second control valves could have separate core members. The first and second control valves could be axially spaced apart along the length of the fuel injector. For example, in one alternative invention (not shown), the first control valve is mounted at an upper end of the injector, remote from the nozzle body, and the second control valve is mounted in the injector body close to the nozzle body. In this configuration, the first control is housed outside the cylinder head bore when the injector is installed in the engine.

The control valve axis need not be offset from the valve needle axis. Instead, the control valve axis and the valve needle axis could be concentric.

The present invention finds particular application when the first fuel is a gaseous fuel, such as natural gas, and the second fuel is a liquid fuel, such as diesel. The first or second fuel may also be used as the control fluid. In a particularly advantageous embodiment, the second fuel is diesel and is used as the control fluid.

Further modifications and variations not explicitly described above can also be contemplated without departing from the scope of the invention as defined in the appended claims.

The invention claimed is:

1. A fuel injector for an internal combustion engine, comprising: a first valve needle having a bore for receiving a second valve needle, the first and second valve needles moveable along a common valve needle axis and arranged to control the injection of first and second fuels; first and second control chambers associated with the first and second valve needles respectively; a first control valve comprising a first control valve member and arranged to vary the pressure of a control fluid in the first control chamber so as to cause opening and closing movement of the first valve needle; and a second control valve comprising a second control valve member and arranged to vary the control fluid pressure in the second control chamber so as to cause opening and closing movement of the second valve needle; wherein both the first and second control valves are housed within a generally cylindrical body portion of the injector, and the first and second control valve members are arranged for linear movement along a common control valve axis offset from and parallel to a center axis of the body portion of the injector, wherein the control valve axis is offset from and parallel to the valve needle axis.

2. The fuel injector according to claim 1, wherein the first fuel is a gaseous fuel, and wherein the second fuel is a liquid fuel.

3. The fuel injector according to claim 2, wherein the control fluid is the second fuel.

4. The fuel injector according to claim 1, wherein the body portion of the injector is arranged to fit within a cylinder head bore of the engine, in use.

5. The fuel injector according to claim 1, wherein the first and second control valve members are substantially hydraulically balanced.

6. The fuel injector according to claim 1, comprising a control valve assembly including a common core member, a first solenoid coil for actuating the first control valve, and a second solenoid coil for actuating the second control valve.

7. The fuel injector according to claim 1, wherein the first control valve member and the second control valve member are each moveable between a filling position, in which the respective control valve member is seated on a valve seat to prevent communication between the respective control chamber and a low-pressure drain for the control fluid, and a drain position in which the respective control valve member is lifted from the valve seat to permit communication between the respective control chamber and the low-pressure drain.

8. The fuel injector according to claim 7, wherein the first valve member is moveable from its filling position to its drain position in a first direction, and wherein the second valve member is movable from its filling position to its drain position in a second direction, opposite to the first direction.

9. The fuel injector according to claim 1, wherein the first control valve member has a larger diameter than the second control valve member.

10. The fuel injector according to claim 7, wherein the first control valve is arranged to govern fluid flow from a source of control fluid to the first control chamber, such that, when the first control valve member is in its filling position, fluid flow from the source of control fluid to the first control chamber is permitted and, when the first control valve member is in its drain position, fluid flow from the source of control fluid to the first control chamber is prevented.

11. The fuel injector according to claim 7, wherein the second control valve is arranged to govern fluid flow from a source of control fluid to the second control chamber, such that, when the second control valve member is in its filling position, fluid flow from the source of control fluid to the second control chamber is permitted and, when the second control valve member is in its drain position, fluid flow from the source of control fluid to the second control chamber is prevented.

12. The fuel injector according to claim 6, further comprising an internal connector housed at least partially within said generally cylindrical body portion of the injector alongside the common core member for electrically connecting first and second solenoid coils to an electrical control unit.

13. The fuel injector according to claim 6, wherein the first control valve member has a larger diameter than the second control valve member.

14. The fuel injector according to claim 8, wherein the first control valve is arranged to govern fluid flow from a source of control fluid to the first control chamber, such that, when the first control valve member is in its filling position, fluid flow from the source of control fluid to the first control chamber is permitted and, when the first control valve member is in its drain position, fluid flow from the source of control fluid to the first control chamber is prevented.

15. The fuel injector according to claim 9, wherein the first control valve is arranged to govern fluid flow from a source of control fluid to the first control chamber, such that, when the first control valve member is in its filling position, fluid flow from the source of control fluid to the first control chamber is permitted and, when the first control valve member is in its drain position, fluid flow from the source of control fluid to the first control chamber is prevented.

16. The fuel injector according to claim 8, wherein the second control valve is arranged to govern fluid flow from a source of control fluid to the second control chamber, such that, when the second control valve member is in its filling position, fluid flow from the source of control fluid to the second control chamber is permitted and, when the second control valve member is in its drain position, fluid flow from the source of control fluid to the second control chamber is prevented.

17. The fuel injector according to claim 9, wherein the second control valve is arranged to govern fluid flow from a source of control fluid to the second control chamber, such that, when the second control valve member is in its filling position, fluid flow from the source of control fluid to the second control chamber is permitted and, when the second control valve member is in its drain position, fluid flow from the source of control fluid to the second control chamber is prevented.

18. The fuel injector according to claim 10, wherein the second control valve is arranged to govern fluid flow from a source of control fluid to the second control chamber, such that, when the second control valve member is in its filling position, fluid flow from the source of control fluid to the second control chamber is permitted and, when the second control valve member is in its drain position, fluid flow from the source of control fluid to the second control chamber is prevented.

* * * * *